US006320392B1

United States Patent
Jonsson

(10) Patent No.: US 6,320,392 B1
(45) Date of Patent: Nov. 20, 2001

(54) ACTIVE FILTER DEVICE

(75) Inventor: Lars Jonsson, Vasteras (SE)

(73) Assignee: Asea Brown Boveri Jumet S.A., Charleroi (BE)

( * ) Notice: Subject to any disclaimer, the term of this patent is extended or adjusted under 35 U.S.C. 154(b) by 0 days.

(21) Appl. No.: 09/380,758

(22) PCT Filed: Mar. 13, 1997

(86) PCT No.: PCT/BE97/00032

§ 371 Date: Sep. 13, 1999

§ 102(e) Date: Sep. 13, 1999

(87) PCT Pub. No.: WO98/40948

PCT Pub. Date: Sep. 17, 1998

(51) Int. Cl.$^7$ .................................................. G01R 21/06
(52) U.S. Cl. ...................... 324/623; 324/76.68; 307/105; 363/40
(58) Field of Search ................................ 324/623, 76.68, 324/76.29, 158.1, 500, 521, 522, 539; 307/105; 363/40

(56) References Cited

U.S. PATENT DOCUMENTS 5,397,927 * 3/1995 Suelzle et al. ...................... 307/105
5,465,203 * 11/1995 Bhattacharya et al. ................ 363/40

FOREIGN PATENT DOCUMENTS

| 0 600 809 A1 | 6/1994 | (EP) . |
| 0 666 632 | 8/1995 | (EP) . |

OTHER PUBLICATIONS

Serge Bernard et al, "A New High Performance Active Harmonic Conditioner Based on the Current Injection Mode", Sep. 22, 1995, *Power Quality Bremen*, Nov. 1995 proceedings, pp. 243–252.

* cited by examiner

*Primary Examiner*—Glenn W. Brown
*Assistant Examiner*—Vincent Q Nguyen
(74) *Attorney, Agent, or Firm*—Venable; Robert Kinberg; Catherine M. Voorhees

(57) ABSTRACT

An active filter device provided for compensating harmonic distortion in a supply line by injecting for each harmonic ($f_k$) to be considered a compensation current. The compensation current being determined by injecting a monitoring current on the supply line at a first ($f1$) and second ($f2$) frequency value, offset respectively on either side of the considered harmonic, and measuring response currents generated by the supply line upon injection of said monitoring currents.

5 Claims, 3 Drawing Sheets

ACTIVE FILTER DEVICE

BACKGROUND OF THE INVENTION

The invention relates to an active filter device provided for compensating harmonic distortion in a supply line, said device comprising a signal processing unit having a first input for receiving an electric current and a voltage, applied on said supply line and being provided for determining, on the basis of said received current and voltage, a load current value for each harmonic frequency of a predetermined first set of harmonic frequency components of a load current on said supply line, said signal processing unit being further provided for generating for each of said harmonics, a control signal on the basis of said load current value, said device further comprising a power module, having a second input for receiving said control signal, and a power source for generating for each of said harmonics a compensation current.

Such an active filter device is known from the article "A new high performance active harmonic conditioner based on the current injection mode" of Serge Bernard and Gerard Trochain published in Power Quality Bremen—November 1995 proceedings p. 243–252. The known active filter device is connected in parallel to the supply line, which connects a power source to a load. The load generates harmonic currents, which are injected into the supply line and which will consequently disturb the power supplied by the source. The active filter device uses power electronics to generate harmonic components, in order to cancel the harmonic currents on the supply line. The signal processing device monitors the electric current and voltage, applied on the supply line, and determines for each harmonic frequency of the first set of harmonic frequencies, the load current on the supply line. On the basis of this load current a control signal is generated, which is supplied to the power module. The latter being provided for generating, under control of the control signal, the compensation current for each harmonic frequency of said first set. The compensation current is then injected into the supply line, in order to compensate the load current. In such a manner, the current on the supply line is "cleaned" from the harmonic currents, injected by the load.

A drawback of the known active filter device is, that the reaction of the supply line upon application of the compensation current, is not accurately determined because the topology of the supply line changes all the time.

SUMMARY OF THE INVENTION

It is an object of the present invention to provide an active filter device enabling to adequately monitor the reaction of the supply line, when a compensation current is applied thereon.

An active filter device according to the present invention is therefore characterised in that said signal processing unit is provided for selecting among a second set of frequency values at least one frequency value (f) and for determining a first (f1) respectively a second (f2) frequency value by shifting said selected frequency value f over a first (g1≠0) resp. a second (g2≠0) value in such a manner that f1=f+g1 and f2=f−g2, said first f1 and second f2 frequency being offset from the harmonic frequencies, said power module being provided for injecting on said supply line, a first respectively a second monitoring current at said first f1 resp. said second f2 frequency, said signal processing unit being provided for measuring from said received current and voltage, a response current generated on said supply line upon injection of said monitoring current and for determining from said response current a transfer function from a voltage of said power source to a line current on said supply line at the first and second frequency, and by determining from said transfer function a phase shift from said voltage to line current at said frequency value f, and for determining said control signal from said phase shift, said power module being provided for generating said compensation current under control of said control signal. By injecting a monitoring current at the first and second frequency, different from the harmonic frequency, a response current at those frequencies is obtained on the supply line, enabling in such a manner to monitor the response of the supply line. As the response current is on a frequency, different from the harmonic, the response current is not added to the load current at the considered harmonic frequencies. A reliable measurement of the response current is then obtained. From the response current a transfer function from a voltage of said power source to a line current at the first and second frequency is determined. This enables to determine the phase shift from said voltage to line current at the frequency f. This phase shift is then used for generating the control signal. A more accurate compensation current is thus generated by a measurement offset from the harmonic frequency.

A first preferred embodiment of an active filter device according to the present invention is characterised in that said second set of frequency values corresponds to said first set of harmonic frequency components. In such a manner the frequency value f is the considered harmonic, f1 and f2 being situated on both sides of the considered harmonic.

Preferably the absolute value of g1 and g2 is equal. This facilitates the transformation towards the harmonic upon determination of the phase shift, as an average value is determined.

Preferably said power module is provided for generating a voltage with a zero phase and for deriving said monitoring current from said voltage, said signal processing unit being provided for determining the phase of said response current. When the voltage applied for generating the monitoring current has a zero phase, the determination of the transfer function becomes easier whereas the phase of the response current indicates directly the phase shift of the transfer function at the considered harmonic frequency.

Preferably said signal processing unit is provided for generating said control signal as a pulse width modulated signal. A pulse width modulated signal is particularly suitable as a control signal for a power transistor, which equips the power module.

BRIEF DESCRIPTION OF THE DRAWINGS

The invention will now be described more detailed with reference to the annexed drawings wherein.

DETAILED DESCRIPTION OF THE INVENTION

Figure 1:
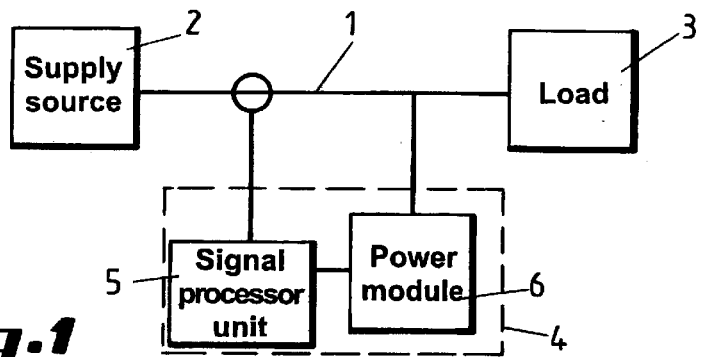
FIG. 1 shows schematically an active filter device connected to a supply line.

In the drawings a same reference has been assigned to a same or analogous element.

The use of power electronic devices in the industry has raised the need for filtering devices, which are provided for improving the quality of the feeding voltage, applied to the different loads. The quality of the feeding voltage being strongly degraded by a large number of heavy variable speed drives, which are more and more used in industrial processes.

FIG. 1 shows schematically the connection of an active filter device to a supply line. The supply line 1 connects an electrical supply source 2, preferably formed by the mains, to a load 3. The active filter device 4 is connected in parallel to the supply line and comprises a signal processing unit 5 and a power module 6. The active filter device 4 is connected in such a manner to the supply line 1, that an input of the signal processing unit 5 is connected on the source side 2, upstream of the power module input, whereas the power module 6 is connected on the load side. In such a manner a monitoring current injected by the power module 6 on the supply line 1 towards the supply source will be monitored easily by the signal processing unit.

Figure 2:
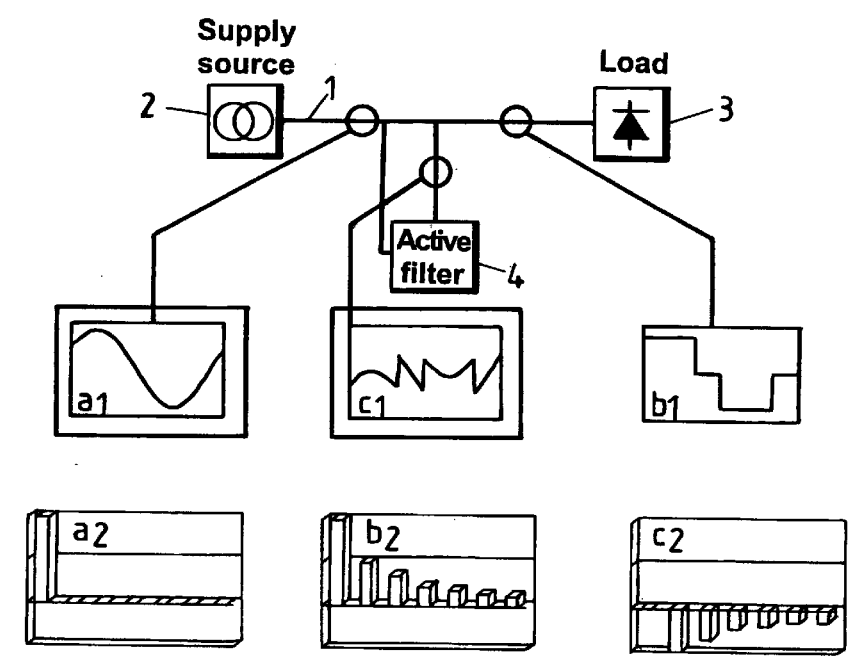
FIG. 2 shows schematically the operating principle of an active filter device.

As illustrated in FIG. 2, the supply source 2 supplies a substantially clean sinus wave ($a_1$) voltage with the basic 50 or 60 Hz frequency ($a_2$) to the supply line. The load 3 generates, due to non-linearities, a series of harmonic distortion signals ($b_1, c_2$) at harmonic frequencies of the basic 50 or 60 Hz frequency. Those harmonic distortion signals are injected on the supply line and distort the voltage supplied by the source 2. The purpose of the active filter device 4 is now to compensate for those distortion signals, by generating the image of the harmonic current consumed by the load.

In all cases:

Supply current of source=load current+current injected by the active filter device.

So in order to obtain a filtering effect of the distortion signals, the power module of the filter device must inject a compensation current with a phase shift of 180°, with respect to the harmonics of the load. If the compensation current is correctly generated, the result will be a perfect sine wave, comprising no harmonics. It is however essential that the phase shift of the response current is correctly determined. The phase shift of the compensation current can then also be correctly determined.

As can be seen from FIG. 2, the amplitude of the harmonic distortion currents, created by the load decreases with increasing value of the harmonic. A limit to the harmonics to be compensated can thus be established without affecting considerably the filtering capacity. Preferably this limit is set from a first series comprising the second harmonic to the twenty-fifth one. The compensation current will then be determined for some or even all of the harmonics, belonging to that first series, depending on the available filter capacity and the distortion, created by the load, as will be described hereinafter.

In order to determine for each of the harmonics, belonging to the first series, the compensation current to be injected on the supply line by the power module, it is important to accurately monitor the supply line. The latter is performed by the signal processing unit 5, which has a first input, on which the electric current and voltage applied on the supply line, are input. The current and voltage values applied on that first input are sampled, at for example 1 2 8 samples per 20 ms. The latter being the period of a 50 Hz signal. Preferably not all of the harmonics between the first and twenty-fifth are considered, as this would require too much processing capacity. Eight to nine harmonic is a suitable choice with the actual available processors.

The total current and voltage, present on the supply line, are considered for sampling purpose. The extraction of the harmonics of the first set to be considered, is performed on the obtained samples. The power module 6 generates for each considered harmonic a first $I_{M1}$ respectively a second $I_{M2}$ monitoring current at a first f1 respectively a second f2 frequency. The monitoring currents $I_{M1}$ and $I_{M2}$ being injected on the supply line. The result thereof is that a response current is created on the supply line. This response current can then be measured by the signal processing unit, as it will be supplied to the first input thereof.

The first and second frequency f1 and f2 are chosen in such a way that they are situated offset of the considered harmonic. Therefore f1 and f2 are selected starting from a frequency value f and first g1 and second g2 value in such a manner that, f1=f+g1 and f2=f+g2. Preferably |g1|=|g2|, wherein || stands for the absolute value. This has the advantage that f1 and f2 are then situated symmetrically on both sides of the selected frequency f, which will simplify the calculation as will be described hereinafter.

The frequency value f is chosen within a second set of frequency values. Preferably the second set comprises as much frequency values as the first set of harmonic frequency components, and correspond with each other. So for example for each harmonic frequency $f_h$ in the first set, there is a frequency f in the second set, so that $f=f_h$. The device is however not limited to sets where $f=f_h$.

Upon selecting the value of f, g1 and g2 it is important that f1<$f_h$<f2 so that f1 and f2 are situated on both sides of the considered harmonic.

Suppose for example that the 5$^{th}$ harmonic of 50 Hz, i.e $f_{5h}$=250 Hz, is considered. If f=$f_{5h}$ then f=250 Hz. Suppose also that |g1|=|g2|=20 Hz, then:

f1=f+g1=270 Hz f2=f−g2=230 Hz so that f1 and f2 are situated on both sides of $f_h$. Alternatively f=240 Hz could have been predetermined and with |g1|=|g2|=20 Hz, f1=260 Hz and f2 =220 Hz would also furnish a first and second frequency f1, f2 on both sides of $f_h$=250 Hz. Care should however been taken that f1≠f2≠$f_{kn}$ as f1 and f2 have to be different from each k$^{th}$ harmonic frequency $f_{kn}$ to be considered.

For the sake of clarity $f_k=f_{kh}$ will be considered in the further description, where k is the considered harmonic.

In order to determine the contribution of a k$^{th}$ harmonic frequency within the load current on the supply line, the power module will inject a first $I_{M1}$ respectively a second $I_{M2}$ monitoring current on the supply line. The power module will therefore generate an arbitrary voltage of for example $V_1$=20 Volt and with the phase $\phi_k$=0° at a first and second frequency f1k and f2k. The power module will then inject on the supply line a monitoring current at frequency f1k and f2k.

Figure 3:
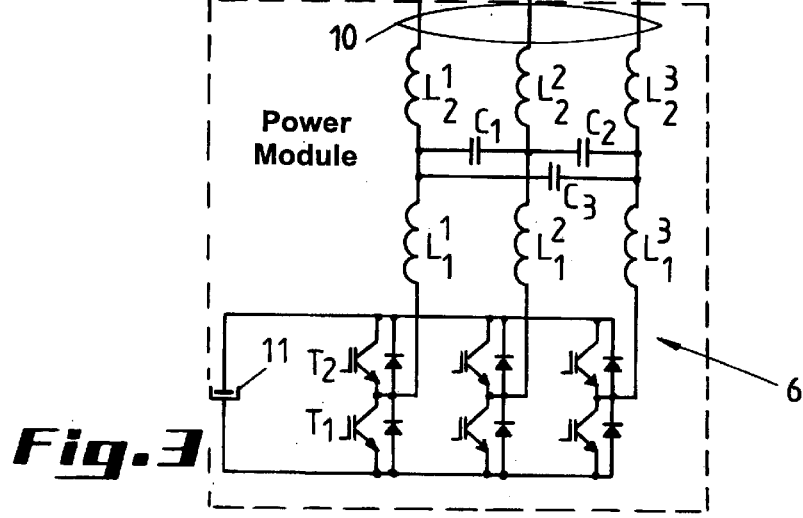
FIG. 3 illustrates an embodiment of a power module as part of an active filter device, according to the present invention.

FIG. 3 shows an embodiment of a power module 6 provided for generating said voltage and injecting said first and second monitoring current $I_{M1}$, $I_{M2}$. The power module is provided for tri-phase current and has therefore a corresponding number of output lines 10. Each output line comprises a series connection of two reactors L1, L2 wherein L1>>L2. An output filter formed by capacitor C1, C2 and C3 is shunted over the connection between L1 and L2. The value of the reactors L and capacitors C will mainly be determined by the harmonics of the first set which are taken into consideration. The power module further comprises a PMW (Pulse Width Modulated) inverter, formed by a series connection of two IGBT (Insulated Gate Bipolar Transistor) (T1, T2) connected in parallel with a series connection of two diodes. The series connection of the reactors is connected with the connection point of the two IGBT's. A DC source 11, for example formed by a capacitor and a suitable charging circuit, is connected in parallel with the series connection of the IGBT's.

As already mentioned the power module generates a voltage under control of a control signal, generated by the signal processing unit. This voltage is output at IGBT's output and converted into a current by the reactors L and capacitors C. The thus formed current is then injected via output lines 10 in the supply line 1.

At the gate of the IGBT's (T1, T2) a PWM signal, generated by the signal processing unit 5, is presented. The signal presented to IGBT's T2 is time shifted with respect to the one presented at T1 in order to avoid short circuits. Since the IGBT's T1 and T2 are opposedly biased, closing for example T1 while simultaneously closing T2 would cause a short circuit. By applying a PWM signal to the gate of the respective IGBT's, the monitoring currents will be output at the output lines 10 and thus injected on the supply line. The selected frequency f1 and f2 are obtained by applying the corresponding PWM signals to the gate of the IGBT's. Thus under control of the signal processing unit PWM signals are generated in order to output the monitoring current $I_{M1}$ and $I_{M2}$ at the selected frequencies f1k and f2k. The monitoring currents preferably have a low value of for example 12A as there is no need to use high current values, because the only purpose of those currents is to monitor the supply line. High currents would only give a higher energy consumption without improving the accuracy of the measurement.

The consequence of injecting the monitoring current on the supply line is, that a response current will be generated on that supply line. The response current will be on the frequencies f1 and f2 of the monitoring current and thus offset from the harmonic fkh to be considered.

The load current on harmonic fkh will thus practically not interfere with the response current, so that a more accurate determination of how the supply line reacts on the monitoring current is possible, thus providing a more reliable analysis of what happens on the supply line.

Figure 4:
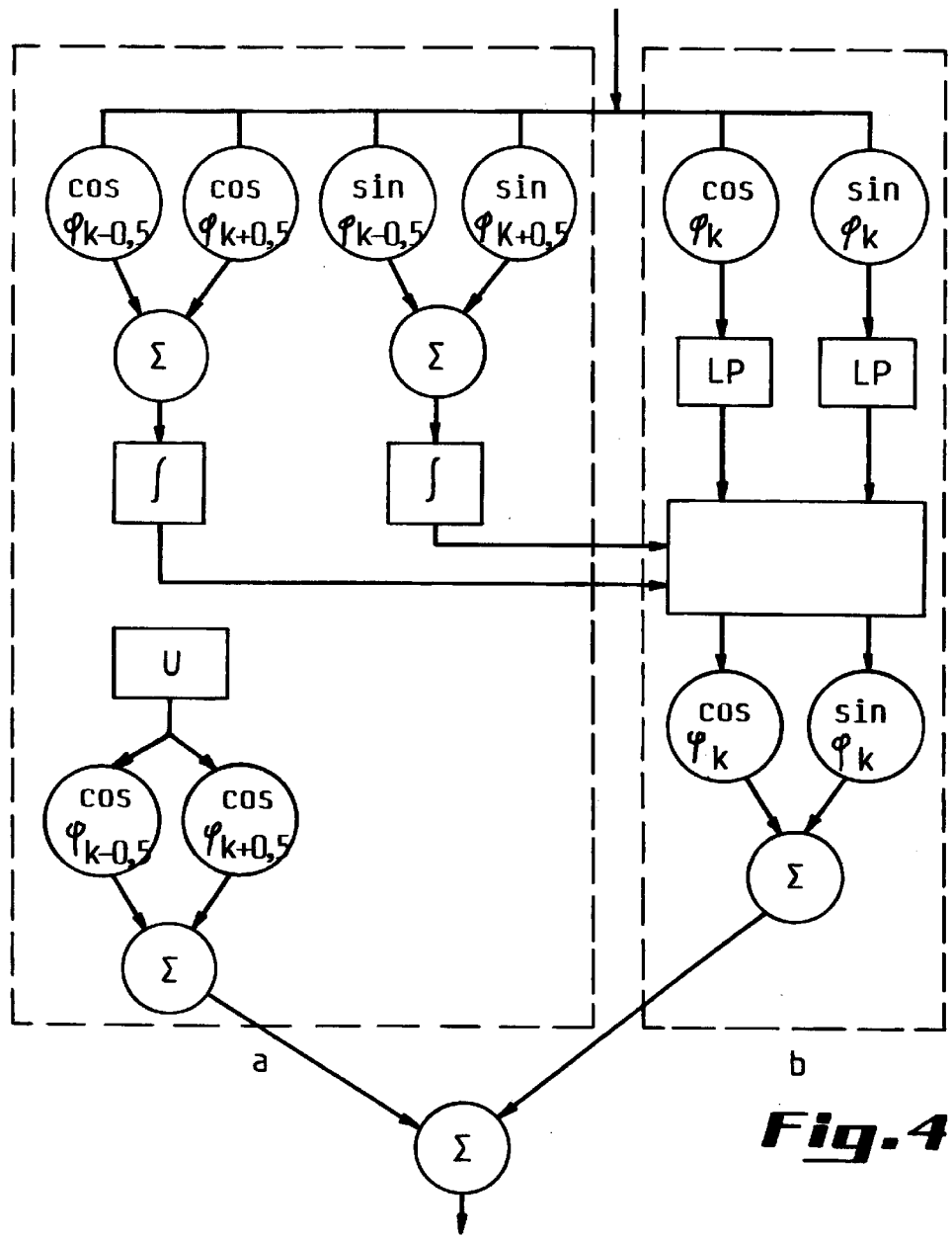
FIG. 4 illustrates more in detail and schematically the set-up of the signal processing unit as part of an active filter device, according to the present invention.

The measurement of the response current is realised by means of the signal processing unit. After sampling the response current, the signal processing unit will determine a transfer function from a voltage of said power source, to a line current at the first fk1 and second fk2 frequency for the considered harmonic fkh. The determination of the transfer function $f_k(t)$, $g_k(t)$ is schematically illustrated in FIG. 4a, illustrating the applied mathematical operation:

$$f_k(t) = I \cos \cdot (\omega_k - \omega_1)t + I \cos(\omega_k + \omega_2)t$$

$$g_k(t) = I \sin \cdot (\omega_k - \omega_1)t + I \sin(\omega_k + \omega_2)t$$

wherein I is the total current such as measured on the input of the signal processing unit.

$$\omega_k = 2\pi f_{kh}$$

$$\omega_1 = 2\pi f_1$$

$$\omega_2 = 2\pi f_2$$

Thereafter a mathematical integration operation is performed $$I_{kf}^c = \frac{1}{T} \int_0^T f_k(t)$$

$$I_{kg}^s = \frac{1}{T} \int_0^T g_k(t)$$

wherein $I_{kf}^c$ resp. $I_{kg}^s$ indicates the cosine resp. the sine component of the amplitude of the current for the $k^{th}$ harmonic, T being the period of the considered wave.

The monitoring current can also be expressed in the complex formulation i.e.

$$I_{rk} e^{-j\phi_k}$$

wherein $$I_{rk} = \sqrt{(I_{kf}^c)^2 + (I_{kg}^s)^2}$$

and $\phi_k$ the phase of the response current. Knowing the voltage $V_{rk}$ applied to the IGBT's for producing the monitoring current the following mathematical operation is applied:

$$\frac{V_{rk} \cdot e^{-j\varphi_0}}{I_{rk} \cdot e^{-j\varphi_k}} = \frac{V_{rk}}{I_{rk}} \cdot e^{-j(\varphi_0 - \varphi_k)}$$

Preferably $\phi_0 = 0$ so that $$\frac{V_{rk}}{I_{rk}} \cdot e^{-j\varphi_k}$$

As now $I_{rk}$ and $V_{rk}$ are known, the phase value $\phi_k$ can be determined for the latter expression.

The determination of the amplitude of $V_{rk}$ for the considered harmonic is realised by controlling the gain of the measured current on the supply line and each time correcting the applied voltage. Knowing the correct phase $\phi_k$ of the response current is of major importance whereas an incorrect phase of the compensation current will in no way enable to correctly compensate for the harmonics induced by the load. The same operation is of course performed for each of the harmonics to be considered. By determining the transfer function, based on the response current for frequencies f1 and f2, offset from the harmonics to be considered, it is possible to realise an active filter device, having a permanent knowledge of the supply line impedance irrespective of the change, that occurs on this supply line. This enables to install an active filter device, without preliminary expensive and time consuming network study, required with passive filter devices. As there is a continuous monitoring of the supply line possible, a continuous adaptation of the filter parameters, to the supply line conditions is possible. Indeed the response current can be regularly determined, which enables to regularly update the control PWM signals and thus the compensation current.

Figure 5:
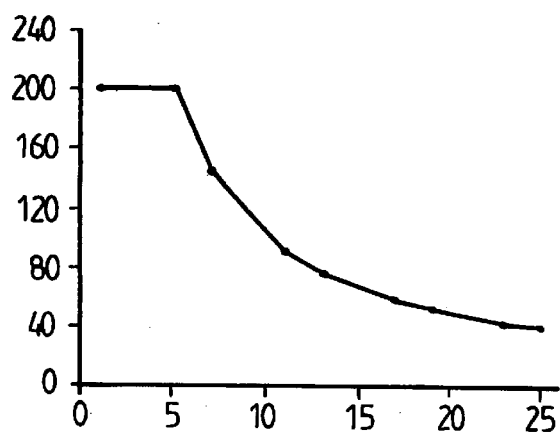
FIG. 5 illustrates an example of the filtering capacity of an active filter device, according to the present invention.

FIG. 5 illustrates an example of some limitation which could occur depending of the capacity of the power module.

In the illustrated example, the power module is able to generate a 200 $A_{RMS}$ compensation current for the fifth harmonic whereas this capacity decreases, due to an increase of the impedance ($\omega L$) of the reactors for higher harmonics. Indeed the DC capacitors voltage level does not allow the generation of 200 A for harmonics higher than the fifth. For those higher harmonics the filter capacity decreases with five times $k^{-1}$. However this limitation is not critical, as the influence of those higher harmonics is less than that of $1^{st}$ to $5^{th}$.

Figure 6:
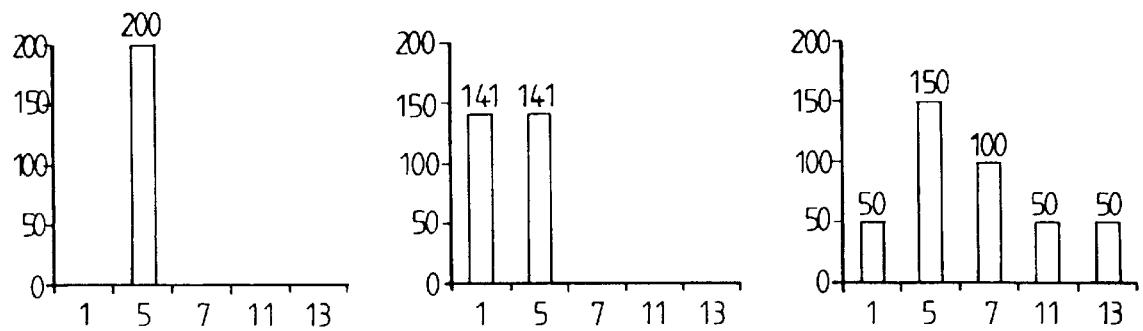
FIG. 6 gives an example, illustrating how the filtering capacity can be distributed over different harmonic frequencies.

FIG. 6 illustrates how the available compensation current, generated by the power module, can be distributed over the different harmonics to be considered. Suppose that the power module is able to generate a 200 $A_{RMS}$ current. This could be distributed by furnishing a 200 $A_{RMS}$ to the $5^{th}$ harmonic only, 141 $A_{RMS}$ to the $1^{st}$ and the $5^{th}$ or 50 $A_{RMS}$ to the $1^{st}$, 150 $A_{RMS}$ resp. 100 ARMS, 50 and 50 $A_{RMS}$ to the $5^{th}$, resp. $7^{th}$, $11^{th}$ and $13^{th}$ harmonics. To realise such a distribution pattern over a number of preselected harmonics, it is sufficient to program the signal processing unit, by assigning maximum current values to the different harmonics. Upon the generation of the PWM control signals, those maximum current values will then be considered.

Figure 7:
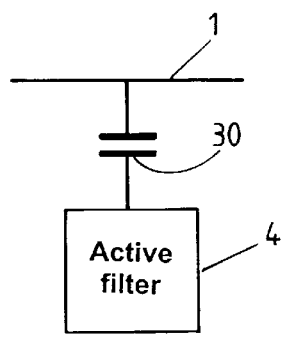
FIG. 7 illustrates the connection of an active filter device, according to the present invention, to a supply line carrying high voltages.

The active filter device according to the present invention can also be used with high voltages, i.e. more than 400 V are present on the supply line. In the latter case the device is coupled via a capacitor 30 to the supply line (FIG. 7) instead of directly. The capacitor 30 will take care of the fundamental voltage in such a manner that the filter device only has to deal with the harmonic current.

What is claimed is:

1. An active filter device provided to be connected to an electric power supply line which is connectable to a supply source provided to supply a voltage to said supply line in order to have an electric load current circulating into said supply line towards a load, said filter device being further provided for-compensating harmonic distortion in said supply line, said active filter device comprising a signal processing unit having an input provided for receiving said electric load current and voltage, said signal processing unit being provided for determining, on the basis of said received load current and voltage, a load current value for each harmonic frequency of a predetermined first set of harmonic frequency components of said load current, said signal processing unit being further provided for determining at least one frequency value (f) by selecting said at least one frequency value among a second set of frequency values stored in a memory of said signal processing unit and for determining a first (f1) respectively a second (f2) frequency value by shifting said frequency (f) over a first (g1≠0) respectively a second (g2≠0) frequency value in such a manner that f1=f+g1 and f2=f+g2 and f1 and f2 have frequency values which are offset with respect to the frequency values of said first set of harmonic frequency components, said active filter device further comprising a power module having a power source provided to supply a power source voltage and being connected to said signal processing unit for receiving said first (f1) and second (f2) frequency value, said power module being provided for generating a first and a second monitoring current having said first (f1) and second (f2) frequency value respectively and for generating a response current on said supply line by injecting said first and second monitoring current on said supply line, said signal processing unit being provided for measuring said response current and for determining thereof a transfer function from said power source voltage to a line current on said supply line at said first and second frequency value, said signal processing unit being also provided for determining from said transfer function a phase shift from power source voltage to line current at said frequency value (f) and for supplying said phase shift to said power module, which is provided for generating a compensation current for each of said harmonic frequency components of said first set on the basis of said phase shift and said load current value.

2. An active filter device as claimed in claim 1, wherein, said second set of frequency values, corresponds to said first set of harmonic frequency components.

3. An active filter device as claimed in claim 1, wherein, the absolute value of g1 and g2 is equal.

4. An active filter device as claimed in claim 1, wherein, said power module is provided for generating a voltage with a zero phase and for deriving said monitoring current from said voltage, said signal processing unit being provided for determining the phase of said response current.

5. An active filter device as claimed in claim 1, wherein, said signal processing unit is provided for generating said control signal as a pulse width modulated signal.

* * * * *